Patented Feb. 18, 1947

2,416,069

UNITED STATES PATENT OFFICE 2,416,069

VULCANIZATION OF HALOGENATED POLYMERS OF ETHYLENE

Samuel Le Roy Scott, Wilmington, Del., assignor to E. I. du Pont de Nemours & Company, Wilmington, Del., a corporation of Delaware No Drawing. Application August 20, 1943, Serial No. 499,387

12 Claims. (Cl. 260—79)

This invention relates to a process for curing halogenated polymers of ethylene and to the cured product.

Chlorinated polymers of ethylene (polythenes) are described in the Fawcett Patent 2,183,556, wherein these products are obtained by polymerizing ethylene at superatmospheric pressures and elevated temperatures in the presence of oxygen-yielding catalysts and chlorinating the polymers thus obtained. Other methods are known for preparing halogenated polymers of ethylene such as treating the polymeric product with a compound that will introduce chlorine into the polymer molecule such, for example, as sulfuryl chloride, carbonyl chloride, and the like as disclosed in the McAlevy application S. N. 480,217, filed March 23, 1923, now Patent No. 2,405,971. The resulting halogenated polymers are somewhat restricted in their uses, however, because of their low softening points and a tendency to exhibit plastic flow (creeping) at ordinary temperatures.

An object of the present invention is to provide a process whereby valuable products are obtained from the halogenated polymers of ethylene. Another object of the invention is to provide a procedure whereby the halogenated polythenes can be cured. Yet another object is to provide cured halogenated polythenes having physical and chemical properties in many respects similar and in others superior to vulcanized rubber. Other objects and advantages of the invention will hereinafter appear.

The above objects are realized in accord with this invention by "curing" (a term fully described below) the halogenated polymers or interpolymers of ethylene. The curing operation is conducted by compounding the halogenated polymer with sulfur, a rubber vulcanization accelerator, and a group II metal oxide, and heating subsequently or simultaneously with compounding. In accord with this application and appended claims the term "curing" will be used to mean that the polymer treated has imparted to it improved properties especially with respect to greater solvent resistance, higher softening point, and increased tensile strength.

Many of the cured products have rubber-like properties and it is accordingly logical to assume that "curing" is somewhat analogous to vulcanization of rubber, although in the problem solved by this invention no lessons could be drawn from the vulcanization of rubber since in contradistinction to rubber, the polymers contemplated herein are essentially free from unsaturation. In order to provide these improved properties, it has been found that the presence of a basic ingredient is required. The assumption can be made that the curing reaction involves the removal of halogen resulting directly in, or followed by, a cross linking reaction. This can be pictured in several ways:

(1) Direct removal of chlorine from adjacent polymer chains with the formation of a connecting bond (Wurtz' reaction);
(2) Similar to (1) with the formation of a sulfur bond between the chains; and
(3) Removal of hydrogen chloride to produce unsaturation followed by curing which would be similar to the vulcanization of rubber.

It is to be understood that these theoretical considerations of the chemical mechanism of the process do not limit the scope of the invention or restrict the claims in any way. They are given primarily to aid the skilled chemist in a better understanding of the invention.

The halogenated polythenes are compounded in preparation for curing by mixing them with the desired amounts of compounding ingredients on regular rubber mill rolls, which compounding may be effected at room temperature or above. The milled product is then cured by heating at a temperature of at least 100° C. for at least fifteen minutes. If it is desired to prepare shaped articles the milled product is curved in a suitable mold under pressure.

In accord with this invention it has been found that in order to effect curing, sulfur and a group II metal oxide should be present. It is likewise desirable to employ a reenforcing agent such as carbon black and a rubber vulcanization accelerator. In one preferred embodiment of the process, it has been found that a dual purpose accelerator may be employed which not only accelerates the curing reaction but also supplies a part of or all of the sulfur therefor. When the reaction is conducted in accord with the preferred embodiments, that is, when a chlorinated polymer of ethylene containing in the order of 35 to 45% chlorine is compounded and cured under optimum conditions, a product is obtained which is infusible and insoluble in the solvents in which the uncured chlorinated polymer of ethylene is soluble. Moreover, the tensile strength is markedly increased and the cured product acquires rubber-like properties.

Examples will now be given illustrating preferred embodiments of the invention in which parts are by weight unless otherwise indicated. Chlorinated polymers of ethylene employed in these examples are prepared by the action of chlorine on ethylene polymers unless otherwise specifically designated.

*Example 1.*—One hundred parts chlorinated polythene (40% chlorine content) is compounded on a rubber mill at room temperature with 50 parts carbon black (Micronex), 3 parts stearic acid, 3 parts sulfur, 2 parts 2-mercaptothiazoline, and 5 parts zinc oxide. The mixture is heated in a mold under pressure at 145° C. for 45 minutes. The resulting compound has a tensile strength of 1650 lbs./sq. in. with an elongation of 40% at break. It is insoluble in benzene and does not soften or crumble at 260° C. When the mixture is cured at 165° C. for 15 minutes, the product is likewise insoluble and infusible but is stiffer than at the lower curing temperature. It has a tensile strength of 2100 pounds per square inch and an elongation of 188% at break.

The original chlorinated polythene is soluble in benzene, sticks to a copper block at 135° C. and is quite soft and weak. When the chlorinated polythene is heated alone in a steel mold at 145° C. for 45 minutes the material is still soluble in benzene, sticks to a copper block below 135° C., and has a tensile strength of 200 pounds per square inch with an elongation of 770% at break.

*Example 2.*—A composition comprising the following ingredients: 100 parts chlorinated polythene (containing 49% chlorine), 10 parts potassium hydroxide, 3 parts sulfur, 5 parts zinc oxide, 1 part dipentamethylenethiuram tetrasulfide (an accelerator sold commercially as "Tetrone A"), 3 parts stearic acid, and 10 parts carbon black (Micronex), is milled on a rubber mill at 120° C. and is heated in a mold at 150° C. for 60 minutes to give a tough, flexible, somewhat lazy elastomer with a tensile strength of 2903 pounds per square inch and an elongation at break of 288%. Upon a 4–6 day immersion, it swells 160% in benzene, 132% in carbon tetrachloride, and not at all in ethanol.

*Example 3.*—One hundred parts chlorinated polythene (containing 49% chlorine and prepared by the action of sulfuryl chloride on ethylene polymer) is compounded on a rubber mill at 80° C. with 50 parts carbon black (Micronex), 3 parts stearic acid, 3 parts sulfur, 2 parts 2-mercaptothiazoline, and 5 parts zinc oxide. The mixture is heated in a mold under pressure at 145° C. for 45 minutes. The product is stiff and does not dissolve in benzene nor soften on a copper block at temperatures up to 250° C.

*Example 4.*—One hundred parts of chlorinated polythene (40% chlorine content) is compounded at room temperature on a rubber mill with 30 parts carbon black (Micronex), 8 parts dipentamethylenethiuram tetrasulfide, and 6 parts zinc oxide. A portion of the mixture is heated for one hour at 145° C. between glass plates to give an infusible, benzene-insoluble product. Another portion of this mixture is cured in stainless steel molds under the same conditions of temperature and time to give a smooth, flexible, tough, rubber-like material with similar infusibility and benzene-insolubility and with a tensile strength of 3050 lbs./sq. in. and an elongation of 284% at break. A 0.50" strip when stretched to breaking point recovers to a length of 0.55".

*Example 5.*—100 parts of a chlorinated polymer of ethylene containing approximately 39% chlorine is compounded with one part of "Tuads" (tetramethylthiuram disulfide), 0.5 part of diphenylguanidine, 5.0 parts of zinc oxide, 3.0 parts of stearic acid, 3.0 parts of sulfur and 10.0 parts of magnesium oxide. The resulting mixture is cured at a temperature of 155° C. for 90 minutes and the cured product has a tensile strength of 2,000 pounds per square inch, an ultimate elongation of 150%, with a retraction of 10%. The return to normal after stretching is very good.

*Example 6.*—100 parts of a chlorinated polymer of ethylene containing approximately 39% chlorine is compounded with 1.0 part of "Captax" (mercaptobenzothiazole), 3 parts of "Tuads," 10 parts of rosin, 5 parts of magnesium oxide, 5 parts of zinc oxide, 3 parts of stearic acid, and 3 parts of sulfur. This mixture is cured at 145° C. for sixty minutes. The cured product has a tensile strength of 3,200 pounds per square inch, an elongation of 560 with a retraction of 30%, a modulus at 300% elongation of 850 pounds per square inch, a shore elasticity of 100 and a very good snap.

*Example 7.*—100 parts of a polymer of ethylene containing 42% chlorine which has been prepared by halogenation with chlorine in carbon tetrachloride solution with sulfuryl chloride as the catalyst is compounded with 20 parts of Micronex (Channel black), 20 parts of tricalcium phosphate, 8 parts of "Tetrone A" (dipentamethylenethiuram tetrasulfide) and 6 parts of zinc oxide. The resulting composition is cured at a temperature of 155° C. for 65 minutes and the cured product has a tensile strength of 2550 lbs./sq. in., an ultimate elongation of 400% with a retraction of 30%, a modulus at 300% elongation of 2100 pounds per square inch with a shore elasticity of 60.

*Example 8.*—100 parts of a chlorinated interpolymer of ethylene and vinyl acetate having a molecular ratio of 16:1 ethylene to vinyl acetate and chlorinated 39 weight percent, is compounded with 1 part of "Captax," 2 parts of "Tuads," 10 parts of rosin, 5 parts of magnesium oxide, 5 parts of zinc oxide, 3 parts of stearic acid and 3 parts of sulfur. The resulting thoroughly kneaded mixture mixture is cured at 145° C. for 60 minutes. The product has a final tensile strength of 3050 lbs. per sq. in., an elasticity of 350%, a recovery of 80%, a modulus at 300% elongation of 2600 lbs. per sq. in. and a fair snap.

Chlorinated polythenes suitable for this invention are not limited to the chlorine contents described in the specific examples but may vary over a wide range. For example, they may contain from 15 to 80% chlorine and for the chlorinated polymers of ethylene it has been found that the preferred range of chlorine content is between 35 and 45%.

The invention has been principally described for the curing of halogenated polymers of ethylene.

Also suitable in the process of the invention are halogenated interpolymers of ethylene with polymerizable, monoethylenic compounds such as propylene, normal and isobutylene, amylene, the higher olefines or mixtures thereof, styrene, vinyl chloride, vinyl acetate, acrylonitrile, fumaric acid esters, acrylic and alpha methacrylic acid esters, amides, nitriles, unsymmetrical dichlorethylene, etc. These interpolymers are described, for example, in U. S. 2,200,529. The halogenated interpolymers are prepared by polymerizing ethylene, in proportion of at least 10% by weight, with one or more other polymerizable material and halogenating the resulting interpolymer, for example, by the method described in application S. N. 480,-217 referred to above.

Interpolymers of ethylene and vinyl acetate, chlorinated to give from 5 to 80 weight per cent chlorine can be successfully cured in accord with the process and it has been found that as the vinyl acetate ratio is increased the chlorine content of the interpolymer may be reduced, the product still having good elasticity. For example, with an ethylene/vinyl acetate ratio of 1:1 only 6 to 10 per cent chlorine is used to give in the final product desirable elastic properties. The vinyl acetate appears to impart plasticity to the cured interpolymer and consequently if present in large amounts chlorine content can be decreased without appreciable decrease in elasticity while conversely higher amounts chlorine should be used with lower amounts of vinyl acetate since chlorine content appears to have the same effect as the vinyl acetate viz. the ability to give elasticity to the cured product.

The choice and amounts of added ingredients are not limited to those of the specific examples. In general, sulfur may be employed in amounts ranging from 0.25% to 15% of the weight of the polymer, but is generally preferred in amounts of 0.5% to 3.0%; accelerators are used in amounts from 0.1% to 15.0% with preferred range from 0.25% to 10.0%, where the higher limits are reserved for those cases in which the accelerator also furnishes the sulfur; Group II metal oxides are employed in amounts from 1% to 30% with a preferred range of 5.0% to 15.0% of the weight of the polymer; and reenforcing agents and fillers are used in amounts up to 60% of the weight of the polymer, the preferred range being dependent on the properties desired in the final product.

Among the rubber vulcanization accelerators that may be used are 2-mercaptothiazoline, dipentamethylenethiuram tetrasulfide, piperidinium pentamethylenedithiocarbamate, diphenylguanidine, tetraethylthiuram disulfide, benzothiazyl disulfide, mercaptobenzothiazole, tetramethylthiuram disulfide, tetramethylthiuram monosulfide, etc. Of special note is the use of thiuram tetrasulfide accelerators, which act as dual purpose curing agents. Materials of this class liberate sulfur during the curing process and hence make it unnecessary to supply additional elementary sulfur, though of course this can be done if desired. Thiuram tetrasulfides are represented by the general formula

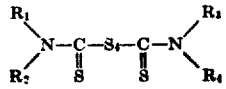

wherein the R's are hydrocarbon radicals which may be alike or different. Also, the two radicals attached to a common nitrogen atom may be joined together to form a single cyclic divalent radical, as in the case of the dipentamethylenethiuram tetrasulfide of the examples. Other examples of this class of accelerators are di(phenylethyl)thiuram tetrasulfide, tetraethylthiuram tetrasulfide, tetrabutylthiuram tetrasulfide, tetramethylthiuram tetrasulfide, di(phenylmethyl)thiuram tetrasulfide and others such as described in U. S. 1,634,925 and U. S. 1,681,717.

Any group II metal oxide may be used, more particularly zinc oxide, magnesium oxide, calcium oxide, barium oxide, and mixtures thereof.

It is frequently desirable to add other compounding ingredients such as antioxidants, lubricants, stabilizers, hydrogen chloride-inhibitors, blowing agents when sponge is desired, other fillers and the like to improve the texture and aging properties of the cured stock.

The curing procedure is also subject to wide variation, both in regard to the time and temperature of treatment. It may be carried out in a mold, press, or in the absence of external pressure as, for example, in the preparation of spongy articles where a blowing agent is employed. In general, temperatures of 130–150° C. are employed for periods ranging from 15 to 60 minutes.

Since the products of this invention vary from soft, elastic materials to hard, horny substances resembling hard rubber, and since they can be prepared in any desired shape by molding, they are useful in numerous fields where their pliability, solvent resistance, nonthermoplasticity, or rubber properties make them applicable. Among the uses for the pliable compositions are bathing apparel (belts, caps, capes, etc.), dental goods (dental dams), drug and surgical supplies (sheeting, tubing, teething rings, nipples, ice bags, etc.), flooring (floor mats, stair treads), footwear (rubbers, heels, taps, impregnated soles, etc.), household items (jar rings, bottle caps, buttons, coasters, fly swatters, wedges, sink stoppers, aprons, gloves, kneeling pads, ash trays, mats, plate wipers, etc.), insulated wire and cable, laboratory supplies (tubing, stoppers, aprons), latex products (can closures, jar rings, etc.), mechanical goods (belting, hose, mountings, gaskets, valve discs, rolls, washers, grommets, auto mats, pedal rubbers, tires for toys, tank linings, windshield wipers, etc.), proofed goods (auto fabrics, crib sheets, shower curtains, raincoats, etc.), sponge rubber products (arm rests, cushions, sponges, mats, toys, baseball plates, etc.), stationer's goods (typewriter feet, telephone bases, coin mats, cord protectors, etc.), thread, toys and novelties (dolls, molded toys, balls, dog toys, sponge novelties, etc.), vehicle accessories (top dressing, tires, pedal pads, etc.).

The hard rubber-like products are useful as binders for paint brush bristles, battery cases, insulators and the like.

I claim:

1. A process of modifying chlorinated polymers of ethylene, obtained by polymerization of ethylene under superatmospheric pressures and elevated temperatures in the presence of oxygen-yielding catalysts which polymers are, after their formation, chlorinated, which comprises compounding said chlorinated polymer of ethylene containing from 35 to 45% chlorine, sulfur, a vulcanization accelerator and a group II metal oxide, and heating the resulting intimate mixture to a temperature between 100° C. and 165° C. for at least 15 minutes.

2. In a process of modifying halogenated polymers from ethylene obtained by the polymerization of ethylene under superatmospheric pressure and elevated temperatures and in the presence of oxygen-yielding catalysts which polymers are, subsequent to their formation, halogenated to contain from 15% to 80% halogen by weight, the step which comprises compounding the halogenated polymer from ethylene, sulfur, a vulcanization accelerator, and a group II metal oxide, and heating the resulting intimate mixture to a temperature between 100° C. and 165° C. for at least 15 minutes.

3. In a process of modifying chlorinated polymers from ethylene obtained by the polymerization of ethylene under superatmospheric pressures and elevated temperatures in the presence of oxygen-yielding catalysts which polymers are, after their formation, chlorinated to 15 to 80% chlorine content, the step which comprises compounding an intimate mixture of the chlorinated polymer of ethylene, sulfur, a vulcanization accelerator and a group II metal oxide, and heating the resulting intimate mixture at a temperature between 100° C. and 165° C. for at least 15 minutes.

4. A modified halogenated polymer of ethylene obtained in accord with the process of claim 2.

5. A modified chlorinated polymer of ethylene obtained in accord with the process of claim 3.

6. A modified halogenated interpolymer from ethylene obtained in accord with the process of claim 10.

7. A modified interpolymer of ethylene and vinyl acetate having a mol ratio of 16 to 1 which contained, prior to curing, 39 weight percent of chlorine and was modified in accord with the process of claim 11.

8. A process for the preparation of a modified chlorinated interpolymer of ethylene and vinyl acetate, obtained by interpolymerizing ethylene and vinyl acetate under superatmospheric pressure and elevated temperature in the presence of an oxygen-yielding catalyst which interpolymer is, after its formation, chlorinated, which comprises compounding said chlorinated interpolymer of ethylene and vinyl acetate containing on a molar basis 16 to 1 ethylene to vinyl acetate which contains 39% chlorine, a vulcanization accelerator, rosin, magnesium oxide, zinc oxide, stearic acid and sulfur and heating the resulting mixture while kneading to a temperature of 145° C. for 60 minutes.

9. A modified chlorinated interpolymer of ethylene and vinyl acetate obtained in accord with the process of claim 8.

10. A process of modifying a halogenated interpolymer of ethylene and a polymerizable compound containing the radical CH₂:C: obtained by interpolymerizing ethylene in proportion of at least 10% by weight with the polymerizable compound under superatmospheric pressure and elevated temperature in the presence of an oxygen-yielding catalyst, which interpolymer is, after its formation, halogenated to contain from 5% to 80% halogen by weight which comprises compounding an intimate mixture of the halogenated interpolymer, sulfur, a vulcanization accelerator, and a group II metal oxide, and heating the resulting intimate mixture to a temperature between 100° C. and 165° C. for at least 15 minutes.

11. A process of modifying a chlorinated interpolymer of ethylene and a polymerizable compound containing the radical CH₂:C: obtained by interpolymerizing ethylene in proportion of at least 10% by weight with the polymerizable compound under superatmospheric pressure and elevated temperature in the presence of an oxygen-yielding catalyst, which interpolymer is, after its formation, chlorinated to contain from 5% to 80% chlorine by weight which comprises compounding an intimate mixture of the chlorinated interpolymer, sulfur, a vulcanization accelerator, and a group II metal oxide, and heating the resulting intimate mixture to a temperature between 100° C. and 165° C. for at least 15 minutes.

12. A modified chlorinated interpolymer of ethylene obtained in accord with the process of claim 11.

SAMUEL LE ROY SCOTT.

REFERENCES CITED

The following references are of record in the file of this patent:

UNITED STATES PATENTS

| Number | Name | Date |
|---|---|---|
| 2,243,470 | Morway | May 27, 1941 |
| 2,115,896 | Wiezevich | May 3, 1938 |
| 2,261,757 | Fawcett (1) | Nov. 4, 1941 |
| 2,200,429 | Perrin | May 14, 1940 |

FOREIGN PATENTS

| Number | Country | Date |
|---|---|---|
| 481,515 | British | Mar. 11, 1938 |

---

Certificate of Correction

Patent No. 2,416,069.                                              February 18, 1947.

SAMUEL LE ROY SCOTT

It is hereby certified that errors appear in the printed specification of the above numbered patent requiring correction as follows: Column 1, line 17, for "1923" read *1943*; column 2, line 30, for "curved" read *cured*; column 4, line 44, strike out the word "mixture" second occurrence; line 69, for the patent number "2,200,529" read *2,200,429*; and that the said Letters Patent should be read with these corrections therein that the same may conform to the record of the case in the Patent Office.

Signed and sealed this 29th day of April, A. D. 1947.

[SEAL]

LESLIE FRAZER,
*First Assistant Commissioner of Patents.* of oxygen-yielding catalysts which polymers are, after their formation, chlorinated to 15 to 80% chlorine content, the step which comprises compounding an intimate mixture of the chlorinated polymer of ethylene, sulfur, a vulcanization accelerator and a group II metal oxide, and heating the resulting intimate mixture at a temperature between 100° C. and 165° C. for at least 15 minutes.

4. A modified halogenated polymer of ethylene obtained in accord with the process of claim 2.

5. A modified chlorinated polymer of ethylene obtained in accord with the process of claim 3.

6. A modified halogenated interpolymer from ethylene obtained in accord with the process of claim 10.

7. A modified interpolymer of ethylene and vinyl acetate having a mol ratio of 16 to 1 which contained, prior to curing, 39 weight percent of chlorine and was modified in accord with the process of claim 11.

8. A process for the preparation of a modified chlorinated interpolymer of ethylene and vinyl acetate, obtained by interpolymerizing ethylene and vinyl acetate under superatmospheric pressure and elevated temperature in the presence of an oxygen-yielding catalyst which interpolymer is, after its formation, chlorinated, which comprises compounding said chlorinated interpolymer of ethylene and vinyl acetate containing on a molar basis 16 to 1 ethylene to vinyl acetate which contains 39% chlorine, a vulcanization accelerator, rosin, magnesium oxide, zinc oxide, stearic acid and sulfur and heating the resulting mixture while kneading to a temperature of 145° C. for 60 minutes.

9. A modified chlorinated interpolymer of ethylene and vinyl acetate obtained in accord with the process of claim 8.

10. A process of modifying a halogenated interpolymer of ethylene and a polymerizable compound containing the radical $CH_2:C$: obtained by interpolymerizing ethylene in proportion of at least 10% by weight with the polymerizable compound under superatmospheric pressure and elevated temperature in the presence of an oxygen-yielding catalyst, which interpolymer is, after its formation, halogenated to contain from 5% to 80% halogen by weight which comprises compounding an intimate mixture of the halogenated interpolymer, sulfur, a vulcanization accelerator, and a group II metal oxide, and heating the resulting intimate mixture to a temperature between 100° C. and 165° C. for at least 15 minutes.

11. A process of modifying a chlorinated interpolymer of ethylene and a polymerizable compound containing the radical $CH_2:C$: obtained by interpolymerizing ethylene in proportion of at least 10% by weight with the polymerizable compound under superatmospheric pressure and elevated temperature in the presence of an oxygen-yielding catalyst, which interpolymer is, after its formation, chlorinated to contain from 5% to 80% chlorine by weight which comprises compounding an intimate mixture of the chlorinated interpolymer, sulfur, a vulcanization accelerator, and a group II metal oxide, and heating the resulting intimate mixture to a temperature between 100° C. and 165° C. for at least 15 minutes.

12. A modified chlorinated interpolymer of ethylene obtained in accord with the process of claim 11.

SAMUEL LE ROY SCOTT.

REFERENCES CITED

The following references are of record in the file of this patent:

UNITED STATES PATENTS

| Number | Name | Date |
|---|---|---|
| 2,243,470 | Morway | May 27, 1941 |
| 2,115,896 | Wiezevich | May 3, 1938 |
| 2,261,757 | Fawcett (1) | Nov. 4, 1941 |
| 2,200,429 | Perrin | May 14, 1940 |

FOREIGN PATENTS

| Number | Country | Date |
|---|---|---|
| 481,515 | British | Mar. 11, 1938 |

---

Certificate of Correction

Patent No. 2,416,069. February 18, 1947.

SAMUEL LE ROY SCOTT

It is hereby certified that errors appear in the printed specification of the above numbered patent requiring correction as follows: Column 1, line 17, for "1923" read *1943*; column 2, line 30, for "curved" read *cured*; column 4, line 44, strike out the word "mixture" second occurrence; line 69, for the patent number "2,200,529" read *2,200,429*; and that the said Letters Patent should be read with these corrections therein that the same may conform to the record of the case in the Patent Office.

Signed and sealed this 29th day of April, A. D. 1947.

[SEAL]

LESLIE FRAZER,
*First Assistant Commissioner of Patents.*